United States Patent [19]

Winston

[11] Patent Number: 4,797,020

[45] Date of Patent: Jan. 10, 1989

[54] SELF-LOCKING MORTISE AND TENON JOINT

[75] Inventor: Robert H. Winston, Quakertown, Pa.

[73] Assignee: Creative Structures, Inc., Quakertown, Pa.

[21] Appl. No.: 129,667

[22] Filed: Dec. 7, 1987

[51] Int. Cl.$^4$ .............................................. B25G 3/00
[52] U.S. Cl. ...................................... 403/231; 52/90; 52/93; 403/230; 403/382
[58] Field of Search ............... 403/232.1, 407.1, 230, 403/189, 231, 254, 263, 262, 406.1, 199, 382; 52/698, 289, 702, 285, 90, 93, 92

[56] References Cited

U.S. PATENT DOCUMENTS

| | | | |
|---|---|---|---|
| 1,054,175 | 2/1913 | Coffin | 403/232.1 |
| 1,192,209 | 7/1915 | Kahn | 52/289 X |
| 1,432,349 | 10/1922 | McFarland | 403/407.1 |
| 1,537,459 | 6/1923 | Campbell | 52/289 |
| 1,601,106 | 9/1926 | Carver | 52/289 |
| 1,728,981 | 9/1929 | Ropp | 52/702 |
| 2,008,087 | 7/1932 | Stromberg | 52/698 |
| 2,994,415 | 8/1961 | Halle | 52/702 |
| 3,022,871 | 2/1962 | Saxe | 52/285 |
| 3,100,012 | 8/1963 | Dunn | 52/90 X |
| 3,109,208 | 11/1963 | Donlin | 52/285 X |
| 3,438,663 | 4/1969 | Conson | 403/230 |
| 3,490,797 | 1/1970 | Platte | 403/407 X |
| 3,504,877 | 5/1968 | Lyon | 403/189 |
| 3,724,678 | 4/1973 | Challier | 211/148 |
| 4,492,489 | 1/1985 | Kantorowich | 403/319 |
| 4,565,465 | 1/1986 | Oberst | 403/230 |
| 4,587,788 | 5/1986 | Bielicki | 52/698 |
| 4,643,610 | 2/1987 | Bien | 403/407.1 |

Primary Examiner—James T. McCall
Attorney, Agent, or Firm—Sanford J. Piltch

[57] ABSTRACT

A mortise and tenon joint including a set of self-locking plates placed in each of two juxtaposed structural members of a beam system for effectively creating, when the beams are positioned together, a strong self-locking joint between the two beams.

18 Claims, 2 Drawing Sheets

SELF-LOCKING MORTISE AND TENON JOINT

BACKGROUND OF THE INVENTION

The invention resides in the field of building construction using mortise and tenon joints to connect separate structural members, one to the other. More particularly, the invention concerns a mortise and tenon joint between structural members which is self-locking.

Mortise and tenon joints have been used to join separate members of structures, such as beams, joists and/or supports therefor, since the first use of permanent wooden structures for support of a covering used for dwelling and shelter. The early mortise and tenon joints have been modified and changed over the years to adapt to the current needs of the society then using such building techniques. Although wooden structures are no longer the primary type of dwelling used in today's society, the practice of joining wooden structural members using mortise and tenon joints continues incorporating present day technology.

It has long been the practice to shape a particular mortise to mate exactly with the tenon to be placed therein at the time of making the joint. This practice allowed for different angles of attachment of one structural member to the other in accordance with the specific requirements of that type of structure. This practice entailed shaving the tenon, beveling either a shoulder on the mortise or chamfering the tenon, or similar adjustment to fit the tenon into the mortise at the desired angle. Once fitted exactly, the joint was secured by fastening one structural member to the other using bolts, nails, wedges or other wooden or metal fasteners.

Present day construction practices require simplified methods of completing structures due to the lack of training in crafts, such as joining, by those building wooden structures. This group includes the handyman and homeowner in addition to the carpenter and other tradesmen.

The homeowner of today has become increasingly conscious of allocating space within the dwelling to view and enjoy the environment. In order to accommodate this new requirement sun spaces, greenhouses and the like are being added to existing homes and planned as part of new residential construction. In either case, the sun space or greenhouse is effectively added onto the basic structure using a metal or wooden beam system with similar type supports. The sun space or greenhouse structure usually has wall elements standing perpendicular to the ground with a roof at an angle or pitch to mate with the support structure of the building and to take advantage of the sun's rays for warming.

The problem for the manufacturer and builder has become the angle or pitch of the roof beams of the sun space or greenhouse when connected to the building support structure. Each such space is unique in that the span from the wall element to the existing building header can vary which, in turn, will change the angle or pitch of the roof beams of the sun space or greenhouse. A change in angle or pitch of the roof beams will require a change or modification in the shape of the mortise or tenon. An adjustment must be made by shaving the tenon, beveling a shoulder of the mortise, or chamfering the tenon, among other methods of fitting the joint together properly. The skilled labor involved in making these kinds of changes and modifications is not usually available at the job site and, if it is, the labor is extremely costly.

The present invention obviates the need for changing and/or modifying the joint elements at the job site to properly fit the joint by implementing a self-locking mechanism within the mortise and tenon joint. The invention also permits the manufacturing of uniform structural elements to be fit together to make a proper joint at the job site with little need for adjustment. Any adjustments which may be necessary for a proper joint fit can be performed by the person building the structure without the need for a specially skilled craftsman.

It is, therefore, an object of the present invention to increase the structural integrity and strength at the attachment point or joint of the several structural elements of the sun space or greenhouse using a self-locking mortise and tenon joint.

It is a further object of the present invention to increase the safety and reduce the risk of damage to existing structures and injuries to persons during installation of sun spaces or greenhouses by using a self-locking mortise and tenon joint.

It is another object of the present invention to make the installation of the structural members easier by reducing the need for modifications at the job site for differing roof pitches.

It is still a further object of the present invention to provide greater economies in manufacturing by reducing the need to manufacture a number of mortise and tenon joints of varying angles between the two structural members allowing for inventorying of a lesser number of structural member types.

It is still another object of the present invention to shorten the required installation time for joining the several structural members comprising the sun space or greenhouse at the job site by incorporating the self-locking mortise and tenon joint into the several structural members.

Other objects will appear hereinafter.

SUMMARY OF THE INVENTION

The self-locking mortise and tenon joint of the present invention is comprised of two structural members which abut one another in a substantial perpendicular fashion. The first of the two structural members is positioned at right angles to the second structural member so that one lateral surface of the first member faces an end face of the second member. The first member has a full mortise cut into the lateral surface which is juxtaposed to the end face of the second member with a pocket mortise cut into the rear wall of the full mortise for receiving a joint securing plate within the pocket mortise.

The joint securing plate has an angled section extending outward along the bottom shoulder of the full mortise. The second member has an inverted mortise cut into the end face opposing the first member for receiving a tongue plate. The tongue plate, when positioned within the mortise in the end face of the second member, extends beyond the dimensions of the end face in a downward direction a distance sufficient to mate and lock with a slot in the outward extending angled section of the joint securing plate in the first member by insertion therein.

Thus, when the tenon of the second member along with the tongue plate depending from the end face juxtaposed to the first member is placed into the full mortise along the opposing lateral face of the first member and the depending tongue plate is placed into the slot of the securing plate a self-locking joint between the two structural members is thereby created.

The self-locking mortise and tenon joint further comprises a bevelled chamfer cut into the downward facing side of the second member immediately adjacent the end face facing the first member. The bevelled chamfer will accommodate the bottom shoulder of the first mortise of the first member when the second member is positioned within the first mortise of the first member at an angle corresponding to the angle or pitch of the second member.

The self-locking joint may be further described as follows. The angled section of the joint securing plate is substantially perpendicular to its back section and the outward facing surface of said back section fits flush to the surface of the first mortise when positioned within the pocket mortise of the first member. The outward facing surface tongue plate fits flush to the surface of the end face of the second member when positioned within the mortise of the end face of the second member.

The joint securing plate and the tongue plate are preferred to have a thickness in the range of ¼ to 3/16 of an inch. The joint securing plate and the tongue plate are preferred to be of a material or materials which are substantially impervious to deterioration in continually elevated humidity conditions.

The self-locking joint of the present invention may be used in a beam system forming the support structure for sun spaces and/or greenhouses.

BRIEF DESCRIPTION OF THE DRAWINGS

For the purpose of illustrating the invention, there are shown in the drawings forms which are presently preferred; it being understood, however, that the invention is not limited to the precise arrangement and instrumentalities shown.

FIG. 3 is a cross-sectional view of the beam system used with the present invention taken along line 3—3 of FIG. 1.

DETAILED DESCRIPTION OF THE INVENTION

The following detailed description is of the best presently contemplated modes of carrying out the present invention. This description is not intended in a limiting sense, but is made solely for the purpose of illustrating the general principles of the invention.

Figure 1:
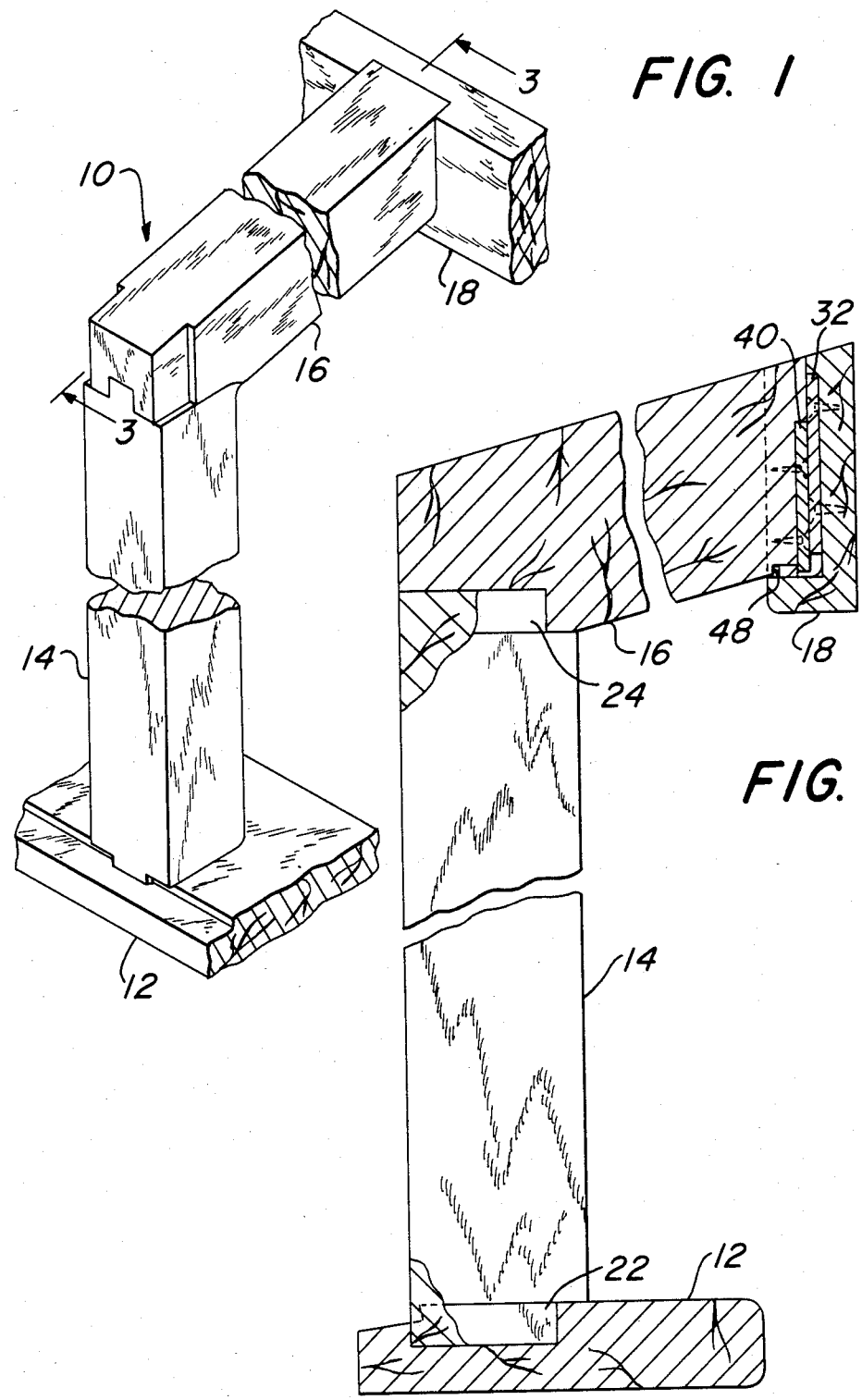
FIG. 1 is a fragmentary isometric view of the beam system used with the present invention.
Figure 2:
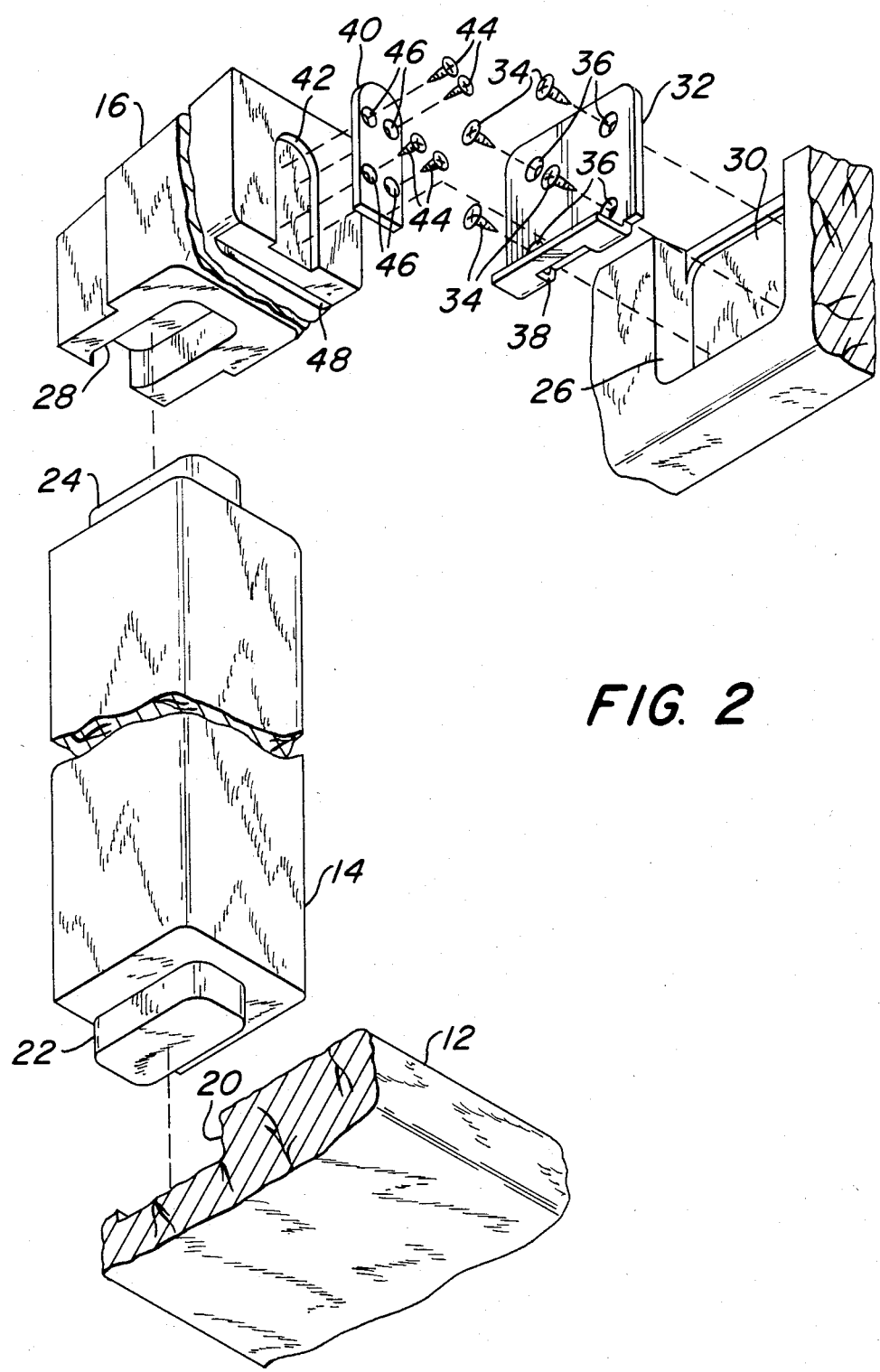
FIG. 2 is an exploded fragmentary isometric view of the individual elements of the beam system of FIG. 1 showing the particular elements of the present invention in an exploded perspective view.

Referring now to the drawings in detail, wherein like numerals represent like elements, there is shown in FIG. 1 a beam system 10 for use in the structural support of a sun space, greenhouse or similar type structure. The beam system 10 is comprised, generally, of a base 12, an upright post or vertical support 14, a rafter 16, and a ledger 18. The base 12 is positioned at or near ground level, if the structure is to be placed at ground level, or on a horizontally level supporting header or rafter system of an existing structure, if the structure is to be placed at a higher elevation, and affixed thereto by the use of nails, screws, or other similar type fastening materials. In explaining the various interrelationships of the elements of the beam system 10, reference can also be made to FIG. 2 and FIG. 3.

At points coincident with the required spacing for the window systems to be mounted between the various upright posts 14, full shouldered mortises, e.g. the full shouldered mortise 20 of FIG. 3, are cut into the base 12. The upright post 14 has a lengthwise dimension (or height) equal to the standard room ceiling height or other desired height plus an additional measured dimension to account for the joints at each of its ends. The downward facing end of the post 14 is cut into a tenon 22 for insertion into the mortise 20 of the base 12. The upward facing end of the post 14 is also cut into a tenon 24 for use with the rafter 16. The post 14 is inserted into the mortise 20, set plumb and fastened to the base 12 using nails, screws, or similar type fastening materials.

The ledger 18 is preferrably mounted to a support header at the appropriate height on the existing structure level to the ground and/or base 12. Full mortises 26 are cut into the outward facing lateral side of the ledger 18, at points coincident with the required spacing for the window systems to be mounted between the various rafters 16. The rafter 16 has a lengthwise dimension equal to the desired distance between the upright post 14 and the ledger 18 (the distance between the wall of the sun space or greenhouse and the rear roof support). Typically his distance may be as short as six feet or as long as twenty feet. The rafter 16 has a portion of its outer facing end (post end) bevelled to match the desired pitch or angle of the roof. The post end of the rafter 16 also has a full shouldered mortise 28 cut into the bevelled section to form a joint with the tenon 24 of the post 14.

The rafter 16 may then be placed in position between the post 14 and the ledger 18 by positioning the tenon 24 of the post 14 into the mortise 28 of the rafter 16 and by positioning the ledger end of the rafter 16 in the mortise 26 of the ledger 18. The result will be a properly fitted mortise and tenon joint between the post 14 and the rafter 16 but an open joint between the rafter 16 and the ledger 18. It will be necessary to bevel the ledger end of the rafter 16 at an angle equal to the pitch of the roof of the sun space or greenhouse. It will also be necessary to cut a chamfer into the downward facing side of the ledger end of the rafter 16 to accommodate the bottom shoulder of the mortise 26 of the ledger 18 so that the upward facing side of the rafter 16 fits flush with the upward facing side of the ledger 18. See, for example, the beam system 10 of FIG. 1 and FIG. 3 as showing the required fit for a proper closed joint. The adjustments and/or modifications to the rafter 16, as set forth above, require additional time, skill and manpower to accomplish then would be the case if the present invention were to be used. Further, the resulting joint would not exhibit the strength of the joint made using the present invention.

The self-locking mortise and tenon joint of the present invention is described as follows. In addition to the full mortise 26, the bevelled ledger end of the rafter 16, and the chamfer cut into the downward facing side of the rafter 16, a pocket mortise 30 is cut into the rear wall of the mortise 26. A rafter locking plate 32, formed so that its back and extension are at right angles to each other, is inserted into the pocket mortise 30 and fastened therein by four screw-type fasteners 34. The screw-type fasteners 34 are inserted through four countersunk holes 36 in each of the corners of the back of the rafter locking plate 32 and into the ledger 18. For better structural integrity the screw-type fasteners may be longer than shown and extend through the ledger 18 and into the building header The rafter locking plate 32 is preferred to be of 3/16 inch aluminum and the fasteners 34 to be of galvanized steel to prevent deterioration due to high humidity conditions of a sun space or greenhouse. Steel items would deteriorate quickly from continued exposure to the moisture.

The rafter locking plate 32 is bent at right angles so that it has, in addition to the back, a forward extending extension. In the forward extending extension of the rafter locking plate 32 a slot 38 is cut to receive the tongue plate 40 which is attached to the ledger end of the rafter 16. The tongue plate is inserted into a mortise 42 cut into the ledger end of the rafter 16. The tongue plate is fastened in place by four screw-type fasteners 44. The screw-type fasteners 44 are inserted through four counter sunk holes 46 located substantially in each of the corners of the tongue plate 40 and into the ledger end of the rafter 16. The tongue plate 40 is dimensioned that, when properly positioned within the mortise 42, extends downward beyond the bottom of the ledger end of the rafter 16 a distance of approximately ⅛ to 3/16 of an inch. A shorter distance may not be sufficient to extend into the slot 38 of the rafter locking plate 32 to provide proper locking of the rafter 16 with the ledger 18.

As stated above the tongue plate is preferred to be of 3/16 inch aluminum and the fasteners 44 to be of galvanized steel to prevent deterioration due to high humidity conditions of a sun space or greenhouse. If deterioration of the plate and fasteners occurred, there would be a loss of structural integrity in the joint between the rafter 16 and the ledger 18.

In addition to the mortise 42 for receiving the tongue plate 40 which is cut into the ledger end of the rafter 16, a bevelled chamfer 48 is cut into the downward facing side immediately adjacent the ledger end of the rafter 16. The bevelled chamfer 48 accomodates the bottom shoulder of the mortise 30 when the rafter 16 in positioned within the mortise 30 of ledger 18. The angle of bevelling of the chamfer 48 may vary in accordance with the change in angle or pitch of the roof of the sun space or greenhouse. A modification of the angle of bevelling may be made on the job site quite quickly and with little or no special skill needed by the workman accomplishing the task.

The strength of the mortise and tenon joint between the rafter 16 and the ledger 18 comes from the self-locking feature of the two plates 32, 40. As the rafter 16 is positioned within the mortise 30 of the ledger 18, the tongue plate 40 is inserted into the slot 38 of the rafter locking plate 32 thereby locking the two beams together. After the positioning is completed, fasteners are used to permanently secure the rafter 16 to the ledger 18. These fasteners may be nails, screws, or bolts if the rafter 16 is of a large dimension for spanning a greater distance. All fasteners must be countersunk so as not to interfere with the window system used for the roof of the sun space or greenhouse.

The strength of the beam system, at the rafter/ledger joint, is directly attributable to the locking plates. The forces which would pull the rafter away from the ledger are overcome by using the locking plates Further, without the locking plates, it is necessary to apply pressure against the ledger from the post end of the rafter to prevent the rafter from sliding out of the joint and falling on workers below during installation. The locking plates prevent the rafter from falling out of the mortise in the ledger unless the joint is unlocked by lifting the rafter. Hence, the self-locking joint of the present invention increases the safety factors in installation of sun spaces and greenhouses using beam systems. Further, actual installation time becomes faster because only a single installer is needed to position and secure a rafter. The exception to this would be an extremely long rafter for spanning distances of more than twenty feet.

Due to the locking plates the degree of tolerance of the ledger being absolutely plumb at the time of installation has become less critical. A simple butt joint, or a shouldered mortise and tenon joint, requires an absolutely plumb ledger beam or an opening could occur between the rafter and the ledger loosening the joint and reducing the structural integrity of the beam system. Using the locking plates permits minimal deviation in the verticality of the ledger beam of approximately 3/16 of an inch without any structural or visual defects occuring.

The locking plates of the present invention also greatly increase the strength of the rafter/ledger joint by increasing the download force of the rafter onto the ledger as compared to a butt joint which has no support in that load direction or a shouldered mortise and tenon joint which is entirely dependent on the strength of the beam material at the bottom of the ledger mortise. Therefore, because of the type of joint use, mortise and tenon, and the addition of the locking plates, the present invention allows for dimensional changes in the beam system occuring from shrinkage and humidity conditions without opening the joint or affecting the structural integrity of the beam system.

The present invention also permits greater efficiencies in manufacturing. With the previously existing mortise and tenon joints, it was required to manufacture a different ledger beam for each roof angle or pitch to allow for the appropriate angle for the bottom shoulder of the ledger mortise. With the present invention, the ledger beams can be mortised prior to designation of roof angle or pitch. This makes possible the fabrication of mortised ledger beams to various window system specifications and the storage of theses ledger beams in inventory. Likewise, the rafter beams receive the same mortise for the tongue plate and the same bevelled chamfer. Hence, the same production fixture can be used to produce rafter beams, regardless of length or the angle or pitch of the roof. With other types of joinery, each rafter would necessarily be cut in accordance with a designated roof pitch. As explained before, the bevelled chamfer may be modified in the field to accommodate different roof pitches and to insure the locking of the plates.

Lastly, the modification or shortening of the rafter beam may be accomplished in the field by the installer. Simple hand tools are all that is required to cut down the rafter and to reinstall the tongue plate in a newly made mortise of the ledger end of the rafter. Previously, special tools were required to create a shouldered tenon on the ledger end of the rafter to fit within the mortise on the ledger to be permanently secured in place.

The locking plates of the present invention along with their method of mounting and use have obviated the need for specially fitted mortise and tenon joints at the rafter/ledger joint. The locking plates have increased the structural strength and integrity of the rafter/ledger joint and made installation safer and easier.

The present invention may be embodied in other specific forms without departing from the spirit or essential attributes thereof and, accordingly, reference should be made to the appended claims, rather than to the foregoing specification, as indicating the scope of the invention.

I claim:

1. A mortise and tenon joint comprised of two structural members, said first member being positioned at right angles to said second member and having a first mortise cut into the lateral surface which is juxtaposed to said second member with a pocket mortise cut into the rear wall of the first mortise to receive a joint securing plate within the pocket mortise, said joint securing plate having an angled section extending outward along the bottom shoulder of the first mortise, said second member having a mortise cut into the end face facing said first member to receive a tongue plate which, when positioned within the mortise in the end face of the second member, extends beyond the outer dimensions of the end face in a downward direction a distance sufficient to mate and lock with a slot in the outward extending angled section of the joint securing plate in the first member by insertion therein, thereby creating a self-locking joint between the two structural members.

2. The mortise and tenon joint according to claim 1 further comprising a bevelled chamfer cut into the downward facing side of the second member immediately adjacent the end face facing the first member to accommodate the bottom shoulder of the first mortise of the first member when the second member is positioned within the first mortise of the first member at an angle corresponding to the angle or pitch of the second member.

3. The mortise and tenon joint according to claim 1, said joint securing plate having its angled section substantially perpendicular to its back section and the outward facing surface of said back section fitting flush to the surface of the first mortise when positioned within the pocket mortise of the first member.

4. The mortise and tenon joint according to claim 1, said tongue plate having its outward facing surface fitting flush to the surface of the end face of the second member when positioned within the mortise of the end face of the second member.

5. The mortise and tenon joint according to claim 1, said joint securing plate and said tongue plate having a thickness in the range of ¼ to 3/16 of an inch.

6. The mortise and tenon joint according to claim 1, said joint securing plate and said tongue plate being of a material or materials which are substantially impervious to deterioration in continually elevated humidity conditions.

7. A beam system including self-locking mortise and tenon joints comprised of two structural members, said first member being positioned at right angles to said second member and having a first mortise cut into the lateral surface which is juxtaposed to said second member with a pocket mortise cut into the rear wall of the first mortise to receive a joint securing plate within the pocket mortise, said joint securing plate having an angled section extending outward along the bottom shoulder of the first mortise, said second member having a mortise cut into the end face facing said first member to receive a tongue plate which, when positioned within the mortise in the end face of the second member, extends beyond the outer dimensions of the end face in a downward direction a distance sufficient to mate and lock with a slot in the outward extending angled section of the joint securing plate in the first member by insertion therein, thereby creating a self-locking joint between the two structural members.

8. The self-locking mortise and tenon joint according to claim 7 further comprising a bevelled chamfer cut into the downward facing side of the second member immediately adjacent the end face facing the first member to accommodate the bottom shoulder of the first mortise of the first member when the second member is positioned within the first mortise of the first member at an angle corresponding to the angle or pitch of the second member.

9. The self-locking mortise and tenon joint according to claim 7, said joint securing plate having its angled section substantially perpendicular to its back section and the outward facing surface of said back section fitting flush to the surface of the first mortise when positioned within the pocket mortise of the first member.

10. The self-locking mortise and tenon joint according to claim 7, said tongue plate having its outward facing surface fitting flush to the surface of the end face of the second member when positioned within the mortise of the end face of the second member.

11. The self-locking mortise and tenon joint according to claim 7, said joint securing plate and said tongue plate having a thickness in the range of ¼ to 3/16 of an inch.

12. The self-locking mortise and tenon joint according to claim 7, said joint securing plate and said tongue plate being of a material or materials which are substantially impervious to deterioration in continually elevated humidity conditions.

13. A beam system for use in constructing sun spaces and/or greenhouses including self-locking mortise and tenon joints comprised of two structural members, said first member being positioned at right angles to said second member and having a first mortise cut into the lateral surface which is juxtaposed to said second member with a pocket mortise cut into the rear wall of the first mortise to receive a joint securing plate within the pocket mortise, said joint securing plate having an angled section extending outward along the bottom shoulder of the first mortise, said second member having a mortise cut into the end face facing said first member to receive a tongue plate which, when positioned within the mortise in the end face of the second member, extends beyond the outer dimensions of the end face in a downward direction a distance sufficient to mate and lock with a slot in the outward extending angled section of the joint securing plate in the first member by insertion therein, thereby creating a self-locking joint between the two structural members.

14. The self-locking mortise and tenon joint according to claim 13 further comprising a bevelled chamfer cut into the downward facing side of the second member immediately adjacent the end face facing the first member to accommodate the bottom shoulder of the first mortise of the first member when the second member is positioned within the first mortise of the first member at an angle corresponding to the angle or pitch of the second member.

15. The self-locking mortise and tenon joint according to claim 13, said joint securing plate having its angled section substantially perpendicular to its back section and the outward facing surface of said back section fitting flush to the surface of the first mortise when positioned within the pocket mortise of the first member.

16. The self-locking mortise and tenon joint according to claim 13, said tongue plate having its outward facing surface fitting flush to the surface of the end face of the second member when positioned within the mortise of the end face of the second member.

17. The self-locking mortise and tenon joint according to claim 13, said joint securing plate and said tongue plate having a thickness in the range of ¼ to 3/16 of an inch.

18. The self-locking mortise and tenon joint according to claim 13, said joint securing plate and said tongue plate being of a material or materials which are substantially impervious to deterioration in continually elevated humidity conditions.

* * * * *